(12) United States Patent
Hernández et al.

(10) Patent No.: US 10,626,316 B2
(45) Date of Patent: Apr. 21, 2020

(54) DRILLING FLUID COMPOSITION CONTAINING A DIESTER-BASED OIL PHASE

(71) Applicant: OXITENO S.A. INDÚSTRIA E COMÉRCIO, São Paulo-SP (BR)

(72) Inventors: Camilo Enrique La Rotta Hernández, Santo André (BR); Olívia Cueva Candido Poltronieri, São Paulo (BR); Paulo de Jesus Cunha Filho, São Paulo (BR); Guilherme Bazzeggio Da Fonseca, Santo André (BR)

(73) Assignee: OXITENO S.A. INDÚSTRIA E COMÉRCIO, São Paulo - SP (BR)

( * ) Notice: Subject to any disclaimer, the term of this patent is extended or adjusted under 35 U.S.C. 154(b) by 125 days.

(21) Appl. No.: 15/739,464

(22) PCT Filed: Jun. 17, 2016

(86) PCT No.: PCT/BR2016/050141
§ 371 (c)(1),
(2) Date: Dec. 22, 2017

(87) PCT Pub. No.: WO2016/205910
PCT Pub. Date: Dec. 29, 2016

(65) Prior Publication Data
US 2018/0179433 A1 Jun. 28, 2018

(30) Foreign Application Priority Data
Jun. 26, 2015 (BR) .......................... 1020150156170

(51) Int. Cl.
*C09K 8/36* (2006.01)
(52) U.S. Cl.
CPC ............ *C09K 8/36* (2013.01); *C09K 2208/20* (2013.01); *C09K 2208/32* (2013.01)
(58) Field of Classification Search
None
See application file for complete search history.

(56) References Cited

U.S. PATENT DOCUMENTS

| | | | |
|---|---|---|---|
| 2,222,949 A | 11/1940 | Henkes | |
| 2,316,967 A | 4/1943 | Miller | |
| 2,316,968 A | 4/1943 | Miller | |
| 2,623,852 A | 12/1952 | Peterson | |
| 2,698,833 A | 1/1955 | Wilson | |
| 2,773,030 A | 12/1956 | Tailleur | |
| 2,773,031 A | 12/1956 | Tailleur | |
| 3,014,862 A | 12/1961 | Tailleur | |
| 3,027,324 A | 3/1962 | Rosenberg | |
| 3,047,493 A | 7/1962 | Rosenberg | |
| 3,047,494 A | 7/1962 | Browning | |
| 3,048,538 A | 8/1962 | Rosenberg et al. | |
| 3,214,374 A | 10/1965 | Sample, Jr. | |
| 3,242,160 A | 3/1966 | Barrett | |
| 3,275,551 A | 9/1966 | Annis | |
| 3,340,188 A | 9/1967 | Barrett | |
| 3,372,112 A | 3/1968 | Parker | |
| 3,377,276 A | 4/1968 | Parker | |
| 3,761,410 A | 9/1973 | Mondshine et al. | |
| 3,979,305 A | 9/1976 | Fischer et al. | |
| 4,039,459 A | 8/1977 | Fischer et al. | |
| 4,374,737 A | 2/1983 | Larson et al. | |
| 4,481,121 A | 11/1984 | Barthel | |
| 4,631,136 A | 12/1986 | Jones, III | |
| 5,403,822 A | 4/1995 | Mueller et al. | |
| 5,441,927 A * | 8/1995 | Mueller .................. | C09K 8/34 507/138 |
| 2016/0230069 A1 * | 8/2016 | Maker ...................... | C09K 8/54 |

FOREIGN PATENT DOCUMENTS

| | | |
|---|---|---|
| CA | 2192998 A1 | 12/1995 |
| GB | 818300 A | 8/1959 |
| GB | 886749 A | 1/1962 |
| WO | 90/06980 A1 | 6/1990 |
| WO | 2007/137709 A1 | 12/2007 |

OTHER PUBLICATIONS

International Search Report from the Brazilian Patent Office in International Application No. PCT/BR2016/050141 dated Jul. 8, 2016.

* cited by examiner

*Primary Examiner* — Jeffrey D Washville
(74) *Attorney, Agent, or Firm* — The Marbury Law Group, PLLC

(57) ABSTRACT

The present patent application discloses a low toxicity and high biodegradability drilling fluid composition in the form of an inverse emulsion containing an oil phase and an aqueous phase, wherein said oil phase comprises a mixture of at least two diesters obtained from the esterification of a carboxylic acid and an alcohol. The selected diesters are suitable for use in drilling of crude oil or natural gas deposits, exhibiting good stability in the formulations assessed under conditions of high pressure and high temperature and in the presence of divalent salt brines.

14 Claims, No Drawings

DRILLING FLUID COMPOSITION CONTAINING A DIESTER-BASED OIL PHASE

RELATED APPLICATIONS

This application is the U.S. national phase entry under 35 U.S.C. § 371 of International Patent Application No. PCT/BR2016/050141, filed on Jun. 17, 2016, which claims priority to Brazilian Application No. BR1020150156170, filed Jun. 26, 2015, all of which are incorporated herein by reference in their entirety.

FIELD OF THE INVENTION

The present invention describes a drilling fluid composition in the form of an inverted emulsion containing an aqueous phase and a predominant oil phase, wherein the oil phase comprises a mixture of diesters.

BACKGROUND OF THE INVENTION

According to the state of the art, oil-based drilling fluids (e.g. kerosene, diesel fuel, paraffins and/or olefins) have been the primary means of providing lubricity to the drill during the hydrocarbon exploration process. A major downside in the use of such materials has been in offshore drilling and in lake systems, mainly due to their pollutant characteristics, which can cause serious environmental problems and eventually lead to complex logistical operations. These oil-based fluids cannot be disposed of at sea or in water, lake and/or underground aquifer systems due to environmental and pollution concerns and their adverse effects on aquatic life. In these cases, oil-based fluids containing naphthas or paraffins need to be transported ashore for some suitable type of disposal or recovery. In Brazil, regulations are being increasingly tightened on the adverse environmental effects caused by the use of paraffins and their mixtures in drilling fluids, especially in offshore operations such as those involved in deep water during pre-salt exploration.

Drilling fluids commonly used in the form of so-called inverted emulsions correspond to three-phase systems, referred to as: oil, water and particulate additives, which include emulsifiers or emulsifying systems, viscosifying agents, additives to prevent loss of filler, alkaline reserves, rheological modifiers, among others, which together form a formulation tailored to the performance needs. Full details of the mixtures developed for these fluids can be found widely described in the literature.

U.S. Pat. Nos. 2,222,949, 2,316,967, 2,316,968 and 2,698,833 mention primarily non-aqueous oil-based drilling fluids which are inherently pollutants. U.S. Pat. No. 2,698,833 addresses a drilling fluid that was prepared with a thermally-stable oil having less than about 5% aromatics and unsaturates by volume. However, this oil still has polluting properties.

Oil-based drilling fluids were originally made from diesel oil fractions containing aromatic constituents. In order to detoxify and reduce the environmental impact caused by the discharge of same, the so-called "non-polluting oils", free of aromatic fractions, were initially proposed as oil phase for drilling fluids. Although some advances have been achieved in the elimination of aromatic compounds, a severe reduction of these and other low biodegradability and high toxicity substances must be achieved quickly. This applies in particular to submerged drilling activities such as those conducted in offshore wells where the exploitation of oil and gas reserves can have a major impact on marine ecosystems, particularly sensitive to the presence of toxic and not easily biodegradable substances.

In a relevant and recognized technology for solving the problems of oil-based drilling fluids the use of continuous ester-based phases has already been described. As an example, U.S. Pat. Nos. 4,374,737 and 4,481,121 disclose ester-based drilling fluids in which the esters are synthesized from non-polluting oils, including non-aromatic mineral oil fractions and vegetable oils from peanut, soybean, flax, maize, rice oils, or even animal oils such as whale oil are mentioned as non-polluting oils in equivalent performance positions. The vegetable and animal oil esters mentioned in these inventions correspond to triglycerides and natural fatty acids which are recognized as safe for the environment and, from the ecological point of view, are differentially superior to the hydrocarbon fractions even when they have been dearomatized.

In a method described in international patent application WO 2007/137709 A1, the composition of a non-aqueous phase has been developed to decrease the toxicity of the drilling fluid in accordance with international standards ASTM E 1367-92 & EPA/600/R-94/025, Section 11. The non-aqueous, or oily phase had at least one additive which, when added to the mixture, ensured the decrease in toxicity of the mixture. Specifically, for the use of low toxicity oil-based continuous phases has been described the use of olefins, wherein olefins are understood to be linear or branched non-aromatic hydrocarbons having at least one unsaturation. The olefins used are characterized by their internal or terminal unsaturations (e.g. alpha position), as well as flash points of at least 80° C. The use of such olefins has previously been described in Canadian patent CA 2192998 A, where they were part of the oil phase, and in oil/water emulsified systems. Significantly, its use was attributed in drilling fluids, where ecological compatibility is mentioned, being biodegradable under both aerobic and anaerobic conditions. Among suitable mixtures of the components described in this patent special mention is made of the olefinic alcohols, ethers and the corresponding esters obtained from carboxylic acids and/or carbonic acid esters.

The invention disclosed in U.S. Pat. No. 4,631,136 relates to compositions for vegetable oil-based drilling fluids which are non-polluting and toxic and which provide improved lubrication properties and stability for use under widely varying loading, pressure and temperature conditions. The compositions described in that patent are primarily based on vegetable oils which comprise essentially long-chain carboxylic acids having one or more unsaturations and a minimum number of 12 to 24 carbon atoms. Among the oils that have been selected are: peanut oil, rapeseed oil, soybean oil, sunflower oil, corn oil, cottonseed oil, rice bran oil, safflower oil, castor oil, palm oil and mixtures thereof. Suitable antioxidants and emulsifiers as well as viscosifiers and rheological modifiers have been included in the described compositions and which have been adapted for addition to water and/or saline solution according to the desired rheological properties for drilling.

U.S. Pat. No. 3,761,410 discloses a water-based drilling fluid with increased lubricity, the water being dispersed as small discrete non-emulsified droplets in the fluid. This composition includes water and insoluble alkyl alcohol, a lubricant additive consisting of a vegetable oil, and a pour point depressant consisting of an alcohol or glycol. This patent reviews the lubrication characteristics required for drilling fluids, which has been the subject of much research as evidenced by the number of patents in the state of the art.

See, for instance, the following U.S. Pat. Nos. 2,773,030, 2,773,031, 3,014,862, 3,027,324, 3,047,493, 3,047,494, 3,048,538, 3,214,374, 3,242,160, 3,275,551, 3,340,188, 3,372,112 and 3,377,276. These patents disclose various types of additives for use in oil-based drilling fluids, oil-in-water emulsion drilling fluids and water-based drilling fluids. It has also been proposed to incorporate an emulsifier into water-based drilling fluids wherein the lubricant additive to be used is water insoluble. Most of the prior art additives function as lubricants under extreme pressure and the drilling fluid is added primarily to provide lubricity to the drill bearings. The additives described in this case decrease the friction that occurs between the drill string and the sides of the hole, thereby increasing the lubricity of the drilling mud.

U.S. Pat. No. 4,374,737 mentions a drilling fluid composition for mixing with water which comprises large amounts of diethanolamine, tall oil fatty acid and imidazoline/amide mixed with a non-polluting and biodegradable vegetable oil comprising a small amount of the composition, the latter being used to act as an emulsifier when water is added in the composition. These fluids are described as not requiring the use of additional emulsifiers to maintain the emulsion and having the desired rheological properties comparable to those obtained with the crude oil or diesel oil; however, they require large amounts of concentrate.

International patent Application No. WO 1990/006980 A1 describes inverted emulsion-based drilling fluids which are characterized by a high degree of ecological compatibility combined with good permanent performance characteristics. The use of new drilling fluid systems has a particular significance in the marine area, but is not limited to it. The drilling fluid systems described in this patent application may be also used for drilling on land, for instance: drilling for aquifer prospecting, geoscientific drilling, etc. The principle applied here has been substantially simplified by the invention of drilling fluids and the use in oil prospecting using the selection of esters based-fluids with low or no ecotoxicity.

Moreover, Patent Application No. WO 1990/006980 refers to the use of selected esters which exhibit free flow (high flowability) and which can be pumped in a temperature range of 0-5° C. The oil phase in these inverted emulsion-based drilling fluids is suitable for use in the fields of oil and gas exploration, and does not harm the environment. However, the described esters were prepared from C2-C12 monofunctional alcohols and C16 to C24 unsaturated monocarboxylic acids, the latter having one or more olefinic double bonds. The invention also exemplifies the use of said esters described in formulations containing—as dispersed aqueous phase—a saturated brine of divalent salts, such as calcium chloride, at least one emulsifier, at least one viscosifying agent, at least one additive for fluid loss and a moderate alkaline reserve in the form of lime. Similarly, U.S. Pat. No. 5,403,822 describes esters obtained from synthetic or natural monocarboxylic acids having 6 to 11 carbon atoms and mono- and/or polyfunctional alcohols such as the oil phase or oil phase component in inverted emulsions for drilling fluids. However, the use of monoesters obtained from monocarboxylic fatty acids, such as those described in the two above-mentioned patents, under the conditions found in the pre-salt (high pressure and temperature), may show instability in the formulations of the drilling fluids, mainly due to the high propensity to hydrolysis of these esters.

According to the above, it is clear that drilling activities in unconventional environments, in which the presence of high temperatures and pressures, together with drilling through geological layers sensitive to the presence of water (e.g. pre-salt), requires the development of new molecules or mixtures of molecules providing good rheological and lubricity properties, as well as ensuring good formation stability, good hydrolytic stability, reuse and, in particular, low toxicity and high biodegradability for use in marine environments.

As it will be better described below, the present invention seeks to solve the above-described problems of the prior art in a practical and efficient manner.

SUMMARY OF THE INVENTION

The present invention relates to a low toxicity and high biodegradability drilling fluid composition in the form of an inverted emulsion containing an aqueous phase and a predominant oil phase, wherein the oil phase comprises the mixture of at least two diesters A and B.

DESCRIPTION OF THE INVENTION

The present invention refers to a composition of low toxicity and high biodegradability drilling fluid in the form of inverted emulsion containing an aqueous phase and an oil phase, wherein the oil phase comprises mixing at least two diesters A and B present in a diester A to diester B ratio of 1:9 to 3:7. The mixture of at least two diesters may be used in the proportion of 1 to 100% by weight, of the oil phase, preferably 30 to 50% by weight of this phase. Said diester A is obtained from the esterification of a dicarboxylic acid comprising 2 to 8 carbon atoms and a lower alcohol comprising 4 to 8 carbon atoms, whereas said diester B is obtained from the esterification of a short-chain monocarboxylic acid comprising 4 to 10 carbon atoms and a dihydroxy alcohol comprising 2 to 8 carbon atoms. The diesters thus obtained have proven thermal stability above 121° C. and pressures above 2.41 MPa (350 psi).

In one preferred embodiment of the present invention, at least one of the carboxylic acids and alcohols employed in the preparation of the diesters A and B is branched into structure.

The present invention makes preferential use of the diesters containing 16 to 22 carbon atoms as diester A, resulting from the esterification between dicarboxylic acids containing 2 to 8 carbon atoms, such as: oxalic acid and its isomers, malonic acid and its isomers, succinic acid and its isomers, glutaric acid and its isomers, adipic acid and its isomers, pimelic acid and its isomers and/or suberic acid and its isomers, and short-chain monohydroxy alcohol containing 4 to 8 carbon atoms such as: 1-butanol and its isomers, 1-pentanol and its isomers, 1-hexanol and its isomers, 1-heptanol and its isomers and/or 1-octanol and its isomers (e.g. 2-ethylhexanol). More preferably, diester A comprises 18 carbon atoms and is obtained from the esterification of 2-ethylhexanoic acid (C8) and 1,2-ethanediol alcohol (monoethylene glycol), thereby resulting in bis(2-ethylhexanoate) ethylene glycol diester.

The present invention makes preferential use of diesters containing 16 to 22 carbon atoms such as diester B, resulting from the esterification between monocarboxylic acids containing 4 to 10 carbon atoms, such as: butanoic acid and its isomers (e.g. butyric acid), pentanoic acid and its isomers (e.g. valeric acid), hexanoic acid and its isomers (e.g. caproic acid), heptanoic acid and its isomers, octanoic acid and its isomers (e.g. 2-ethylhexanoic acid), nonanoic acid and its isomers (e.g. pelargonic acid) and/or decanoic acid and its isomers), and dihydroxy alcohol containing 2 to 8 carbon atoms, such as: ethylene glycol, propylene glycol, diethyleneglycol, butylene glycol, and/or triethylene glycol and isomers. More preferably, the diester B comprises 20 carbon atoms and is obtained from the esterification of 1,4-butanedioic acid (succinic acid) (C4) and 2-ethylhexanol alcohol (C8), thereby resulting in the succinate diester of bis (2-ethylhexyl).

The oil phase of the drilling fluid composition represents 51 to 99% by weight of the inverted emulsion relative to the total volume of the drilling fluid composition, preferably representing 60% by weight, while the aqueous phase is preferably concentrated salt brine. Most preferably, the concentrated salt brine is composed of bivalent salts including, but not limited to, calcium chloride.

The drilling fluid composition may further comprise at least one additive selected from emulsifiers, mono and divalent salts (e.g. sodium chloride, calcium chloride, etc.), viscosity modifying agents, biocides, hydrogen sulfide scavengers (e.g. glyoxal, formaldehyde, trizaine, etc.), thickeners (e.g. organophilic clay), corrosion inhibitors, pH controllers (e.g. baryta, sodium hydroxide, calcium hydroxide) and filter reducers.

The diesters present in the oil phase of the drilling fluid composition are free of aromatic hydrocarbons, such as benzene, phenol, toluene, ethylbenzene and xylene, and polyaromatic hydrocarbons such as anthracene, naphthalene, phenanthrene, etc., and exhibit the physicochemical properties and characteristics described in Table 1.

TABLE 1

PHYSICOCHEMICAL PROPERTIES OF THE ESTERS REPORTED IN THE INVENTION.

| Propriety | Diester A | Diester B |
|---|---|---|
| Acidity (mg KOH/g) | 4.5-6.5 | 0.4-2.5 |
| Saponification index (mg KOH/g) | 300-310 | 310-330 |
| Flash point (° C.) | 80-120 | 80-160 |
| Kinematic viscosity at 40° C. (cSt) | 3.00-6.00 | 4.00-7.00 |

The diesters present in the oil phase of the drilling fluid composition have low acute toxicity in marine sediments in accordance with applicable environmental regulatory standards and are biodegradable anaerobically in marine sediments in accordance with applicable environmental regulatory standards.

These diester properties confer upon the drilling fluid composition advantages such as high stability in terms of emulsion integrity, reduction of filler precipitation and/or flocculation and/or coagulation and reduction of phase separation. Thus these compositions present applications compatible with drilling activities under challenging conditions of high temperatures, pressure and saline concentrations, in addition to high biodegradability and low toxicity.

Particularly, the oil-phase drilling fluid composition comprising mixtures obtained from the diester containing 18 carbon atoms (e.g. bis(2-ethylhexanoate) ethylene glycol) and the diester containing 20 carbon atoms (e.g. bis (2-ethylhexanyl) is applicable in: a) drilling systems under challenging conditions of temperature and pressure, and b) in drilling in water-sensitive formations (e.g. reactive clays and/or salt formations), maintaining the intrinsic stability of the formulations and the stability of the formations to be drilled under the conditions to be used. This composition maintains the low acute toxicity (LC50≤300 mg/kg) of the formulations when evaluated in sediments and when compared against the internal C16 to C18 olefin standard, as well as the high anaerobic biodegradability according to national and international regulation for its use in drilling in deep water and reuse, subsequent treatment and/or disposal.

In another embodiment of the invention, the drilling fluid composition may comprise in the oil phase, in addition to the diesters already described herein, at least one paraffin and at least one olefin, wherein said paraffin comprises an n-paraffin, a branched paraffin and mixtures thereof, and said olefin includes an alpha-olefin, an internal olefin, a branched olefin and mixtures thereof. Preferably, when the diesters, paraffin and olefin are present in the oil phase, these are respectively present in the proportions of: 20:10:50; 30:20:50; 45:45:10; 50:20:30; 50:30; 20/or 50:40:10.

Therefore, the mixture of at least two diesters A and B of the present invention is capable of totally replacing the use of paraffinic and/or olefinic oil phases, or is employed to partially replace the paraffins and olefins commonly present in drilling fluids, reducing the environmental impact caused by them.

EXAMPLES

Example 1

A drilling fluid obtained based on the mixture of two pure diesters: A e B used in a ratio (A:B) of 2:8 as oil phases in inverted oil/water emulsions in a ratio of 60:40 to the aqueous phase. The products in the mixture of the example described correspond to the pure (A) diester of C18 (bis-(2-ethylhexanoate) ethylene glycol) and the pure (B) C20 diester (Bis (2-ethylhexanyl) succinate. The fluid was formulated according to the following composition described in table 2:

TABLE 2

FORMULATION OF OIL/WATER DRILLING FLUID BASED ON THE MIXTURE OF PURE C18 AND C20 DIESTERS: E.G, BIS-(2-ETHYLHEXANOATE) ETHYLENE GLYCOL AND BIS-(2-ETHYLHEXANYL)SUCCINATE.

| Formulations based on mixture of Synthetic Esters | % in the formulation | Weight (g) |
|---|---|---|
| Mixture of Synthetic Diesters A and B | 60 | 135.6 |
| Hydrated lime | 2.86 | 6.8 |
| Primary emulsifier | 0.96 | 2.9 |
| Secondary emulsifier | 0.60 | 1.8 |
| Concentrate calcium chloride saturated brine | 39.00 | 92.8 |
| Organophilic clay - BR | 2.4 | 7.2 |
| Calcium carbonate | 4.3 | 10.2 |
| Baryte | 20.0 | 47.6 |

The effect of rolling temperature and pressure were evaluated under challenging conditions of 135° C. (275° F.) and 345 MPa (500 psi). The formation of buffer due to thermal instability and both phase separation and precipitation of fillers were evaluated for 14 days. Likewise, the rheological parameters of: Apparent viscosity (Va), Viscosity (Vp), Gel points 10 s and 10 min (Pg) and Flow limit (Le). The results were compared with those obtained for controls where the oil phase used corresponds to the same formulation described above, but replacing the diester mixture with n-paraffin and/or alpha-olefin.

In an embodiment of the invention, the obtained oil-based perforation fluid comprises, in the oil phase, a mixture of synthetic diesters, an olefin and a paraffin. More specifically, this fluid comprises a mixture of two diesters A and B present in the (A:B) ration of 2:8, by an olefin selected from alpha olefin (C12-C18), internal olefin (C12-C18), branched olefin (C22-C25) or mixtures thereof, and by a paraffin, selected from n-paraffinic (C13-C15), branched paraffin (C17-C21) or mixtures thereof. The oil phase of the fluid preferably comprises 20% of the mixture of two synthetic diesters, namely bis(2-ethylhexanoate) ethylene glycol and bis(2-ethylhexanyl) succinate), 30% of olefin (ex: C12 alpha olefin, C 16 internal olefin, C18 branched olefin) and 50% of paraffin (ex: C13 n-paraffin or C17 branched paraffin.

Example 2

The oil-based obtained drilling fluid comprises, in the oil phase, a mixture of synthetic diesters, an olefin and a paraffin, wherein the mixture of two synthetic diesters A and B is present in the (A:B) ratio of 2:8. More specifically, the drilling fluid oil phase comprises 20% of the mixture of two synthetic diesters, namely, bis-(2-ethylhexanoate) ethylene glycol and bis(2-ethylhexanyl) succinate, 30% of C12 alpha-olefin, and 50% of C13 n-paraffin. The fluid was formulated according to the base composition described in table 3.

TABLE 3

BASE COMPOSITION OF OIL/WATER DRILLING FLUID COMPOSED OF A MIXTURE OF PURE DIESTERS CONTAINING 18 AND 20 CARBON ATOMS: BIS-(2-ETHYLHEXANOATE) ETHYLENE GLYCOL AND BIS-(2-ETHYLHEXANYL) SUCCINATE, ALPHA-OLEFIN (C12), AND N-PARAFFIN (C13).

| Formulation Synthetic ester, paraffin and olefin-based ternary system | % in the formulation | Weight (g) |
| --- | --- | --- |
| Mixture of Synthetic Diesters A and B | 17.10 | 40.7 |
| n-Paraffin (C13) or branched paraffin (C17) | 28.50 | 67.8 |
| Alpha-olefin (C12) or branched olefin (C18) | 11.40 | 27.1 |
| Hydrated lime | 2.86 | 6.8 |
| Primary emulsifier | 0.96 | 2.9 |
| Secondary emulsifier | 0.60 | 1.8 |
| Concentrate calcium chloride saturated brine | 39.00 | 92.8 |
| Organophilic clay - BR | 2.4 | 7.2 |
| Calcium carbonate | 4.3 | 10.2 |
| Baryta | 20.0 | 47.6 |

The effect of temperature and roll pressure were evaluated under conditions of high temperature and pressure of 135° C. (275° F.) and 3.45 MPa (500 psi). The formation of buffer due to thermal instability and both phase separation and precipitation of fillers were evaluated for 14 days. Likewise, the rheological parameters of: Apparent viscosity (Va), Viscosity (Vp), Gel points 10 s and 10 min (Pg) and Flow limit (Le). The results were compared with those obtained for the controls, wherein the oil phase used corresponds to the same formulation described above, but for the replacement of the diester mixture with C13 n-paraffin or C12 alpha-olefin.

Example 3

The obtained oil-based perforation fluid comprises, in the oil phase, a mixture of synthetic diesters, an olefin and a paraffin, wherein the mixture of two synthetic diesters A and B is present in the (A:B) ratio of 2:8. More specifically, the drilling fluid oil phase comprises 20% of the mixture of two synthetic diesters, namely, bis-(2-ethylhexanoate) ethylene glycol and bis(2-ethylhexanyl) succinate, 30% of a branched olefin (C18), and 50% of an n-paraffin (C13). The fluid was formulated according to the base composition described in table 3.

Example 4

The obtained oil-based perforation fluid comprises, in the oil phase, a mixture of synthetic diesters, an olefin and a paraffin, wherein the mixture of two synthetic diesters A and B is present in the (A:B) ratio of 2:8. More specifically, the drilling fluid oil phase comprises 20% of the mixture of two synthetic diesters, namely, bis-(2-ethylhexanoate) ethylene glycol and bis(2-etilhexanila) succinate, 30% of a branched olefin (C18), and 50% of a branched paraffin (C17). The fluid was formulated according to the base composition described in table 3.

Example 5

The obtained oil-based perforation fluid comprises, in the oil phase, a mixture of synthetic diesters, an olefin and a paraffin, wherein the mixture of two synthetic diesters A and B is present in the (A:B) ratio of 2:8. More specifically, the drilling fluid oil phase comprises 20% of the mixture of two synthetic diesters, namely, bis-(2-ethylhexanoate) ethylene glycol and bis(2-etilhexanila) succinate, 30% of an alpha-olefin (C12), and 50% of a branched paraffin (C17). The fluid was formulated according to the base composition described in table 3.

Table 4 shows the expected results after 336 h rolling at 121° C./0.45 MPa (500 psi) for the oil-based drilling fluid formulations in oil/water inverted emulsion systems, according to the examples described above:

TABLE 4

OBSERVED RHEOLOGICAL PROPERTIES FOR THE EXEMPLIFIED FORMULATIONS AFTER 14 DAYS AGING UNDER CONDITIONS OF HIGH TEMPERATURE AND PRESSURE (HT/HP) OF 135° C. (275° F.) AND 3.45 MPA (500 PSI).

| Parameter | Control: 1 | Control: 2 | Example 1 | Example 2 | Example 3 | Example 4 | Example 5 |
| --- | --- | --- | --- | --- | --- | --- | --- |
| | C13 n-paraffin | C12 alpha-olefin | Mixture A + B | Mixture A + B + (C13) n-paraffin + (C12) alpha-olefin | Mixture A + B + (C13) n-paraffin + (C18) branched olefin | Mixture A + B + (C17) branched paraffin + (C18) branched olefin | Mixture A + B + (C17) branched paraffin + (C12) alpha olefin |
| Initial kinematic viscosity (40° C.) cSk | <5.0 | <5.0 | <7.0 | <7.0 | <7.0 | <7.0 | <7.0 |

TABLE 4-continued

OBSERVED RHEOLOGICAL PROPERTIES FOR THE
EXEMPLIFIED FORMULATIONS AFTER 14 DAYS AGING UNDER
CONDITIONS OF HIGH TEMPERATURE AND PRESSURE (HT/HP) OF
135° C. (275° F.) AND 3.45 MPA (500 PSI).

| Parameter | Control: 1 | Control: 2 | Example 1 | Example 2 | Example 3 | Example 4 | Example 5 |
|---|---|---|---|---|---|---|---|
| | C13 n-paraffin | C12 alpha-olefin | Mixture A + B | Mixture A + B + (C13) n-paraffin + (C12) alpha-olefin | Mixture A + B + (C13) n-paraffin + (C18) branched olefin | Mixture A + B + (C17) branched paraffin + (C18) branched olefin | Mixture A + B + (C17) branched paraffin + (C12) alpha olefin |
| Gel 10 s— (Pa) | 6.1 | 2.0 | 3-5 | 2.0-5 | 1.5-7.0 | 1.5-7.0 | 1.5-7.0 |
| Gel 10 min (Pa) | 6.1 | 2.0 | 3-7.5 | 3.5-7.5 | 2.0-7.0 | 1.5-7.0 | 2.0-7.0 |
| Vp (L600-L300) (Pa) | 4.1 | 1.0 | 0-10 | 4.0-6.0 | 4.0-10.5 | 4.0-9.0 | 4.0-10.5 |
| Va (L600/2) (Pa) | 2.1 | 2.0 | 6.3-12 | 5.5-12 | 2.0-11.3 | 2.0-9.5 | 2.0-11.3 |
| Yield point (Pa) | 15.8 | 13.0 | 3-12.5 | 1.5-12.5 | 0.8-16.0 | 0.5-16.0 | 0.8-16.0 |
| Flow limit (Pa) | 13.8 | 14.0 | 5-12.5 | 3.0-12.5 | 1.5-15.0 | 1.0-15.0 | 1.5-15.0 |
| Phase separation | No | No | No | No | No | No | No |
| Plugging or coagulation | No | No | No | No | No | No | No |
| Filler precipitation | No | No | No | No | No | No | No |

Countless variations affecting the scope of protection of this application are allowed. Therefore, it is to be emphasized that this invention is not limited to the specific configurations/embodiments described above.

The invention claimed is:

1. A low toxicity and high biodegradability drilling fluid composition in the form of an inverted emulsion containing an oil phase and an aqueous phase, comprising:
   in the oil phase, a mixture of at least two diesters A and B having a ratio of diester A to diester B from 1:9 to 3:7, wherein:
   the diester A is bis-(2-ethylhexanoate) ethylene glycol; and
   the diester B is bis-(2-ethylhexanyl) succinate.

2. The drilling fluid composition according to claim 1, wherein the drilling fluid composition has a kinematic viscosity below 7 cSt at 40° C., has a flash point above 80° C., and is free of aromatic and polyaromatic hydrocarbons.

3. The drilling fluid composition according to claim 1, wherein said oil phase represents 51 to 99% by weight of the inverted emulsion relative to the total volume of the drilling fluid composition.

4. The drilling fluid composition according to claim 1, wherein the mixture of at least two diesters A and B represents 1 to 100% by weight of the total oil phase.

5. The drilling fluid composition according to claim 1, wherein the aqueous phase in the inverted emulsion comprises saline solution concentrated in salts.

6. The drilling fluid composition according to claim 5, wherein said saline solution concentrated in salts comprises bivalent salts.

7. The drilling fluid composition according to claim 1, further comprising at least one additive selected from emulsifiers, salts, viscosity modifying agents, biocides, hydrogen sulfide scavengers, thickeners, corrosion inhibitors, pH controllers or filtrate reducers.

8. The drilling fluid composition according to claim 1, further comprising at least one paraffin and at least one olefin in the oil phase.

9. The drilling fluid composition according to claim 8, wherein said paraffin is selected from n-paraffin and branched paraffin, or mixtures thereof.

10. The drilling fluid composition according to claim 8, wherein said olefin is selected from alpha-olefin, internal olefin or branched olefin, or mixture thereof.

11. The drilling fluid composition according to claim 8, wherein a ratio, in oil phase, between the mixture of diesters: paraffin:olefin is from 20:10:50 to 50:40:10.

12. The drilling fluid composition according to claim 1, wherein said oil phase represents 60% by weight of the inverted emulsion relative to the total volume of the drilling fluid composition.

13. The drilling fluid composition according to claim 1, wherein the mixture of at least two diesters A and B represents 30 to 50% by weight of the total oil phase.

14. The drilling fluid composition according to claim 5, wherein said saline solution concentrated in salts comprises calcium chloride.

* * * * *